United States Patent
Wang et al.

(10) Patent No.: US 10,868,298 B2
(45) Date of Patent: Dec. 15, 2020

(54) POROUS CARBON NANOTUBE MICROSPHERE AND PREPARATION METHOD AND USE THEREOF, LITHIUM METAL-SKELETON CARBON COMPOSITE AND PREPARATION METHOD THEREOF, NEGATIVE ELECTRODE, AND BATTERY

(71) Applicant: Suzhou Institute of Nano-Tech and Nano-Bionics (SINANO), Chinese Academy of Sciences, Suzhou (CN)

(72) Inventors: Yalong Wang, Jiangsu (CN); Zhaolong Du, Jiangsu (CN); Wei Lu, Jiangsu (CN); Liwei Chen, Jiangsu (CN); Xiaodong Wu, Jiangsu (CN)

(73) Assignee: Suzhou Institute of Nano-Tech and Nano-Bionics (SINANO), Chinese Academy of Sciences, Suzhou (CN)

( * ) Notice: Subject to any disclaimer, the term of this patent is extended or adjusted under 35 U.S.C. 154(b) by 117 days.

(21) Appl. No.: 15/127,809

(22) PCT Filed: Mar. 20, 2015

(86) PCT No.: PCT/CN2015/074733
§ 371 (c)(1),
(2) Date: Sep. 21, 2016

(87) PCT Pub. No.: WO2015/139660
PCT Pub. Date: Sep. 24, 2015

(65) Prior Publication Data
US 2017/0110719 A1 Apr. 20, 2017

(30) Foreign Application Priority Data

Mar. 21, 2014 (CN) .......................... 2014 1 0106376
Aug. 13, 2014 (CN) .......................... 2014 1 0395114

(51) Int. Cl.
*H01M 4/36* (2006.01)
*H01M 4/38* (2006.01)
(Continued)

(52) U.S. Cl.
CPC ............. *H01M 4/362* (2013.01); *C01B 32/00* (2017.08); *C01B 32/05* (2017.08); *C01B 32/174* (2017.08);
(Continued)

(58) Field of Classification Search
CPC ...... H01M 4/362; H01M 4/382; H01M 4/587; H01M 12/08; H01M 10/0525;
(Continued)

(56) References Cited

U.S. PATENT DOCUMENTS

2005/0130043 A1* 6/2005 Gao .................... H01M 4/0435
429/231.95
2007/0190422 A1* 8/2007 Morris .................. H01M 4/364
429/231.4
(Continued)

FOREIGN PATENT DOCUMENTS

CN 101239713 A 8/2008
CN 101567437 A 10/2009
(Continued)

OTHER PUBLICATIONS

Machine English language translation of Cha Seung Il et al. KR20110018735 (A)—Feb. 24, 2011 (Year: 2011).*
(Continued)

*Primary Examiner* — Jonathan G Jelsma
*Assistant Examiner* — Omar M Kekia
(74) *Attorney, Agent, or Firm* — Schwegman Lundberg & Woessner, P.A.

(57) ABSTRACT

Disclosed is a porous carbon nanotube microsphere material and the preparation method and use thereof, a lithium
(Continued)

metal-skeleton carbon composite and the preparation method thereof, a negative electrode of a secondary battery, a secondary battery, and a metal-skeleton carbon composite. The porous carbon nanotube microsphere material is spherical or spheroidal particles composed of carbon nanotubes. The spherical or spheroidal particles have an average diameter of 1 μm to 100 μm. A large number of nanoscale pores are composed of interlaced nanotubes inside the particle, and the pore size is 1 nm to 200 nm. The preparation method thereof comprises: mixing and dispersing carbon nanotubes and a solvent, and performing spray drying, to obtain the carbon nanotube microspheres. The lithium metal-skeleton carbon composite is obtained by uniformly mixing lithium metal in a melted state with a porous carbon material carrier and cooling.

8 Claims, 11 Drawing Sheets

(51) Int. Cl.
| | |
|---|---|
| H01M 4/62 | (2006.01) |
| H01G 11/36 | (2013.01) |
| C01B 32/05 | (2017.01) |
| H01G 11/86 | (2013.01) |
| C01B 32/174 | (2017.01) |
| C01B 32/00 | (2017.01) |
| H01M 4/587 | (2010.01) |
| H01M 10/0525 | (2010.01) |
| H01M 12/08 | (2006.01) |
| H01M 4/134 | (2010.01) |
| B82Y 30/00 | (2011.01) |
| B82Y 40/00 | (2011.01) |
| H01M 4/02 | (2006.01) |

(52) U.S. Cl.
CPC .............. *H01G 11/36* (2013.01); *H01G 11/86* (2013.01); *H01M 4/364* (2013.01); *H01M 4/382* (2013.01); *H01M 4/587* (2013.01); *H01M 4/625* (2013.01); *H01M 10/0525* (2013.01); *H01M 12/08* (2013.01); *B82Y 30/00* (2013.01); *B82Y 40/00* (2013.01); *C01P 2004/32* (2013.01); *C01P 2004/61* (2013.01); *C01P 2006/40* (2013.01); *H01M 4/134* (2013.01); *H01M 2004/021* (2013.01); *Y02E 60/13* (2013.01); *Y10S 977/742* (2013.01); *Y10S 977/847* (2013.01); *Y10S 977/948* (2013.01)

(58) Field of Classification Search
CPC .......... H01M 2004/021; C01B 31/0273; C01P 2004/32; C01P 2004/61; C01P 2006/40; B82Y 40/00; B82Y 30/00; Y10S 977/742; Y10S 977/847; Y10S 977/948
USPC ........................................................ 429/405
See application file for complete search history.

(56) References Cited

U.S. PATENT DOCUMENTS

| | | | | |
|---|---|---|---|---|
| 2007/0237990 | A1* | 10/2007 | Kim ...................... | B82Y 30/00 429/522 |
| 2010/0189625 | A1* | 7/2010 | Hisashi ................. | B82Y 30/00 423/415.1 |
| 2013/0264524 | A1* | 10/2013 | Liu ........................ | B82Y 30/00 252/503 |
| 2014/0342209 | A1* | 11/2014 | He ....................... | H01M 10/056 429/101 |
| 2015/0056513 | A1* | 2/2015 | Fray ....................... | B82Y 30/00 429/231.4 |
| 2015/0064574 | A1* | 3/2015 | He .................... | H01M 10/0568 429/300 |

FOREIGN PATENT DOCUMENTS

| | | | | |
|---|---|---|---|---|
| CN | 101607704 | A | | 12/2009 |
| CN | 102515152 | A | | 6/2012 |
| CN | 102891306 | A | | 1/2013 |
| CN | 103214245 | A | | 7/2013 |
| KR | 20110018735 | | * | 2/2011 .............. B01J 19/10 |

OTHER PUBLICATIONS

"International Application No. PCT/CN2015/074733, International Search Report dated Jun. 17, 2015", w/ English Translation, (dated Jun. 17, 2015), 8 pgs.
"International Application No. PCT/CN2015/074733, Written Opinion dated Jun. 17, 2015", (datd Jun. 17, 2015), 8 pgs.
"Chinese Application No. 20140106376.0, Office Action dated Jul. 5, 2016", (dated Jul. 5, 2016), 7 pgs.
Haixia, Yi, "Preparation and application of carbon nanotube capsules", w/ English Abstract—China Academic Journal Electronic Publishing House, (2007), 75 pgs.

* cited by examiner

POROUS CARBON NANOTUBE MICROSPHERE AND PREPARATION METHOD AND USE THEREOF, LITHIUM METAL-SKELETON CARBON COMPOSITE AND PREPARATION METHOD THEREOF, NEGATIVE ELECTRODE, AND BATTERY

PRIORITY APPLICATIONS

This application is a U.S. National Stage Filing under 35 U.S.C. 371 from International Application No. PCT/CN2015/074733, filed on 20 Mar. 2015, and published as WO 2015/139660 on 24 Sep. 2015, which claims the benefit of priority of Chinese Application No. 201410106376.0, filed on 21 Mar. 2014 and Chinese Application No. 201410395114.0, filed on 13 Aug. 2014; which applications and publication are incorporated herein by reference in their entirety.

TECHNICAL FIELD

The present disclosure relates to the field of material science, and particularly to a porous carbon nanotube microsphere and the preparation method and use thereof. The disclosure also relates to the field of energy battery, and particularly to a lithium metal-skeleton carbon composite and the preparation method thereof, a negative electrode, and a battery.

BACKGROUND ART

In 1991, carbon nanotubes were discovered under a high-resolution transmission electron microscope for the first time by Iijima Sumio, an electron microscopy expert in the basic research laboratory of NEC Corporation, Japan. Due to good electrical conductivity and mechanical strength, carbon nanotubes have extensive application value and application prospect in fields such as material enhancement, field emission, drug delivery, nano-electronic and nanoscale appliances, etc.

Unlike the one-dimensional linear structure of carbon nanotubes, porous carbon nanotube microspheres prepared from carbon nanotubes are spheres, which, besides the advantages possessed by a typical microspherical structure, have the ability of self-supporting due to the good mechanical strength of carbon nanotubes themselves, so that the spheres maintain a relatively high mechanical strength and can keep the particle structure intact and not damaged under a certain external pressure applied. At the meanwhile, porous carbon nanotube microspheres have a large number of controllable gap structures, thereby increasing the utilization of space volume. Porous carbon nanotube microspheres further have the characteristics of strong conductivity, chemical stability, etc., and their properties have been greatly improved on the basis of conventional carbon nanotube materials. Porous carbon nanotube microsphere can accommodate a large number of guest molecules or guests having a large size, and may be used to load a variety of functional materials to form composite functional materials, and therefore have a broad application prospect. Although there were some literatures reporting carbon nanotube microspherical structures, most of them employed a template method and a micellar method and were difficult to obtain a large number of carbon nanotube microspheres for practical use. Furthermore, the template method and the micellar method will introduce substances such as surfactants, etc., to improve the affinity between carbon nanotubes, which results in that most of carbon nanotubes form shell of the sphere, while the amount of carbon nanotubes inside the sphere is too small, such that the carbon nanotube microspheres formed have a hollow structure and are difficult to be used as a carrier material for supporting guest materials.

On the other hand, lithium batteries have the advantages of high energy density, good cycling performance, good environment friendliness, etc., and can be widely used in fields of transportation, communication, electronic devices, etc.

At present, a commercial lithium ion battery typically uses a graphite-type material as a negative electrode, and has a theoretical capacity of 372 mAh/g and typically a reversible capacity of about 340 mAh/g; whereas lithium metal has a specific capacity of 3860 mAh/g, which is 10 times or greater than that of a graphite negative electrode. If lithium metal can be used as a negative electrode of a lithium ion battery, the energy density of the lithium ion battery will be greatly improved. However, in a battery prepared by using lithium metal as a negative electrode material, uneven deposition of lithium ions on the lithium metal negative electrode will occur in the process of charging, and the dendrites formed may puncture the separator, which results in short circuit and may lead the battery to dangers such as combustion, explosion, etc. Therefore, lithium metal negative electrode has never been commercially used. FMC Corporation, U.S. (owner of patent/applications of U.S. Pat. No. 8,021,496 B2, US 2013/0181160 A1, CN 102255080 A) has prepared lithium metal particles of 20 μm to 100 μm using a melting emulsification method, followed by modification treatment performed on the surfaces thereof. By using an electrode prepared from this material as a negative electrode of a battery, it is possible to increase the specific surface area of lithium metal, reduce the effective surface current density on the negative electrode in the process of charging and discharging, and alleviate the growth of dendrites. The Woo Young Yoon research team, South Korea (see literatures: Advanced Functional Materials 2013, 23, 1019-1027, Journal of Power Sources 2010, 195, 6143-6147) has prepared lithium metal particles using a melting emulsification method and modified the lithium metal particles on the surfaces thereof, followed by compressing to prepare an electrode. By doing so, it is also possible to improve the safety of the battery when lithium metal is used in the negative electrode. China Energy Lithium Co., Ltd., Tianjin, China (patent application CN 102122709A), proposed a process in which prepared lithium metal particles were pressed into a graphite negative electrode to obtain a negative electrode containing lithium metal. This can make up the loss of lithium present in a limited amount in the positive electrode material, which loss occurs in the cycling process of the lithium ion battery. However, for preparing lithium metal particles by the melting emulsification method as above, it is required to disperse lithium metal in an inert solvent having a high boiling point, under the condition of vigorously stirring at high temperature, and after the dispersion is finished, several times of washing are needed to obtain the lithium metal microparticles. Such process of preparation has complex steps and relatively severe requirements for equipment.

SUMMARY

In view of disadvantages in the prior art, in a first aspect of this invention, an object of the present disclosure is to provide a novel porous carbon nanotube microsphere material.

Another object of the present disclosure is to provide a preparation method for a porous carbon nanotube microsphere material, which has the characteristics of simple operation, low cost, high production efficiency, etc., and thus the mass production of porous carbon nanotube microsphere material can be achieved.

A still another object of the present disclosure is to provide the use of the aforementioned porous carbon nanotube microsphere material in the preparation of a battery or a supercapacitor, wherein the battery includes a lithium-sulfur battery or a fuel cell. In order to achieve the aforementioned objects, the technical solutions used in the present disclosure are as follows.

A porous carbon nanotube microsphere material, said carbon nanotube microsphere material being spherical or spheroidal particles each of which is composed of carbon nanotubes, wherein a large number of nanoscale pores are formed by interlaced carbon nanotubes inside the particle, and the spherical or spheroidal particles have an average diameter of 1 µm to 100 µm.

Further, the porous carbon nanotube microsphere material at least has any one of a minute spherical solid aggregated structure, a spherical aggregated structure, a spheroidal aggregated structure, a porous spherical aggregated structure, and a donut-shaped aggregated structure.

A method for preparing any one of the aforementioned carbon nanotube microsphere materials, comprising: dispersing carbon nanotubes in a solvent to form a dispersion, followed by spray drying the dispersion, to prepare the porous carbon nanotube microsphere material.

Wherein, the dispersing may be performed without the assistance of surfactant.

The conditions for the spray drying include an air inlet temperature of 150 to 250° C. and an air outlet temperature of 75° C. or more, for example 75 to 150° C., and the air outlet temperature is preferably 90° C. or more.

Further, the specific steps of the preparation method may include: dispersing carbon nanotubes in a solvent to obtain a dispersion; then feeding the dispersion into an atomizer of a spray dryer; controlling liquid feed speed, atomization conditions, temperature and velocity of hot air, to allow the solvent in liquid droplets containing carbon nanotubes be rapidly evaporated, such that the carbon nanotubes in the atomized liquid droplets are aggregated to form porous carbon nanotube microspheres; and then discharging the porous carbon nanotube microspheres from the bottom of a drying tower of the spray dryer and/or a cyclone separator. Compared to the prior art, advantages of this aspect of the present disclosure include the followings. The porous carbon nanotube microsphere material has an interior completely formed by interlacing and stacking carbon nanotubes each other and there are a large number of nanoscale gaps both inside and outside the particles, and it thus has a larger pore size and a good mechanical strength, capable of being used as a carrier material in nano-science, etc., and widely used in various fields. Further, it has a simple preparation method, strong controllability, and low cost, and the mass production is easily achieved. Particularly, the assistance of surfactant is not required in the preparation method of the present disclosure, and particles are formed merely by interlacing and stacking carbon nanotubes each other. Therefore, the size the pores contained in the particle is large and the mechanical strength is high, and it is thus suitable for use as a carrier material for loading a guest material.

In a second aspect of the present disclosure, based on the porous carbon nanotube microsphere material of the first aspect, there is provided a lithium metal-skeleton carbon composite and the preparation method thereof, a negative electrode, and a battery, so as to overcome the disadvantages in the prior art.

In order to achieve the object described above, the present disclosure provides the following technical solutions.

An embodiment of this disclosure provides a metal-skeleton carbon composite, comprising a porous carbon material carrier and metal formed in pores of the carbon material carrier.

Preferably, the metal includes lithium, sodium, and potassium.

Preferably, in the metal-skeleton carbon composite described above, the carbon material includes carbon fiber microspheres, porous carbon nanotube microspheres, and acetylene black.

Preferably, in the metal-skeleton carbon composite described above, the porous carbon nanotube microsphere material is the porous carbon nanotube microsphere material in the first aspect of the present disclosure.

Preferably, in the metal-skeleton carbon composite described above, the porous carbon nanotube microspheres have an average pore size of 10 nm to 50 nm.

Preferably, the loaded amount of lithium metal in the metal-skeleton carbon composite is 5 mass % to 80 mass %, more preferably 30 to 50 mass %.

An embodiment of this disclosure further provides a negative electrode of a battery, using the lithium metal-skeleton carbon composite described above.

Preferably, the negative electrode of the battery of the present disclosure is a negative electrode of a secondary battery.

Accordingly, an embodiment of this disclosure further discloses a battery, comprising the negative electrode described above.

Preferably, the battery of the present disclosure is a secondary battery.

Preferably, the secondary battery described above is a lithium-sulfur battery, a lithium-oxygen battery, a lithium-polymer battery, or a rechargeable lithium ion battery.

An embodiment of this disclosure further provides a preparation method for a lithium metal-skeleton carbon composite, comprising uniformly mixing lithium metal in a melted state with a porous carbon material carrier, followed by cooling, to obtain a lithium metal-skeleton carbon composite.

Preferably, in the preparation method for a lithium metal-skeleton carbon composite described above, the carbon material carrier is porous carbon nanotube microspheres, said porous carbon nanotube microspheres being prepared by the method for preparing a porous carbon nanotube microsphere material in the first aspect described above.

Compared to the prior art, advantages of this aspect of the present disclosure are as follows. The lithium metal-skeleton carbon composite prepared in the present disclosure can be used in various lithium batteries, such as lithium-oxygen batteries, lithium-polymer batteries, and rechargeable lithium ion batteries. A notable field is the applications of rechargeable lithium ion battery in portable electronic devices and in hybrid electric vehicles. In these applications, it is desirable that a secondary lithium battery provides the highest specific capacity and a good cycling performance under the premise of ensuring safety. However, lithium metal, as the most desirable negative electrode material, cannot be directly used, because its safety is poor due to the generation of dendrites in the process of charging and discharging. The lithium metal-skeleton carbon composite prepared in the present disclosure can improve the safety of batteries by inhibiting the formation of dendrites, and also provide a relatively high specific capacity and a good cycling performance.

BRIEF DESCRIPTION OF THE DRAWINGS

In order to illustrate the technical solutions in the present disclosure or in the prior art more clearly, the drawings required for describing this disclosure or the prior art will be simply introduced below. It is apparent that the drawings described below are merely some embodiments contained in this disclosure, and other drawings may be further obtained by ordinary skilled person in the art according to these drawings without exerting inventive work.

DESCRIPTION OF EMBODIMENTS

Figure 1:
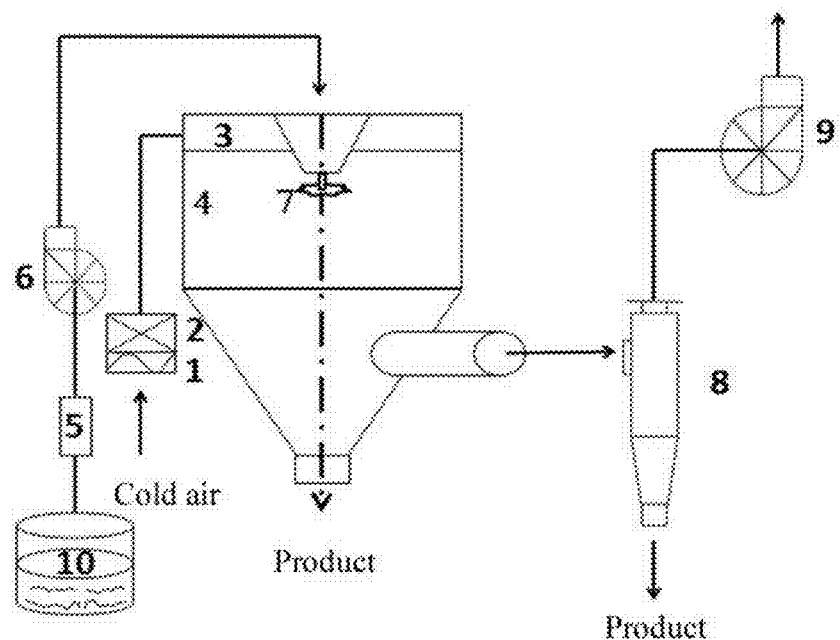
FIG. 1 is a structural schematic diagram of a system for preparing a porous carbon nanotube microsphere material according to one typical embodiment of the present disclosure, wherein: 1—air filter, 2—heater, 3—hot air dispenser, 4—drying chamber, 5—filter, 6—pump, 7—centrifugal spray nozzle, 8—cyclone separator, 9—air fan, 10—liquid feed tank.

As described above, in view of disadvantages in the prior art, the inventors have proposed the technical solutions of the present disclosure upon a large amount of studies and practices, and the detailed illustrations are as follows.

Embodiments in First Aspect

An aspect of the present disclosure provides a porous carbon nanotube microsphere material, which is a material of spherical or spheroidal particles, each particle being composed of carbon nanotubes, wherein a large number of nanoscale pores are formed by interlaced carbon nanotubes inside the particle, and the spherical or spheroidal particles have an average diameter of 1 μm to 100 μm, preferably 1 μm to 25 μm.

Further, the porous carbon nanotube microsphere material may have any one of a minute spherical solid aggregated structure, a spherical aggregated structure, a spheroidal aggregated structure, a porous spherical aggregated structure, and a donut-shaped aggregated structure, but is not limited thereto.

Further, the carbon nanotubes may be selected from, but not limited to, any one of multi-walled carbon nanotubes, double-walled carbon nanotube, and single-walled carbon nanotubes, or a combination thereof, preferably multi-walled carbon nanotubes.

Further, the carbon nanotubes may be selected from, but not limited to, any one of commercial carbon nanotubes, purified carbon nanotubes (purified carbon nanotubes free of catalyst), and surface-functionalized carbon nanotubes, or a combination thereof.

As for the aforementioned surface-functionalized carbon nanotube, the group modifying on the surface of the carbon nanotube may be selected from, but not limited to, groups such as —COOH, —OH, —NH$_2$, etc.

Preferably, pure carbon nanotubes free of catalyst, particularly pure multi-walled carbon nanotubes free of catalyst, are used as the carbon nanotubes.

Further, by means of subjecting the porous carbon nanotube microspheres to a pressure test, the maximum tolerable pressure may be up to 20 MPa. Here, the tolerable pressure means that the porous structure of particles can be still maintained after the pressure is released. In the present disclosure, after a pressure test of 20 MPa, the spheres are still maintained to be not broken.

Further, by means of measuring the specific surface area of the porous carbon nanotube microspheres, it can be found that the specific surface area thereof is 100 to 1500 $m^2/g$, preferably 150 to 500 $m^2/g$.

Further, the pores contained in the porous carbon nanotube microspheres have a pore size distribution of 1 to 200 nm, preferably 1 to 50 nm.

Further, upon testing the surface, the aforementioned carbon nanotube microspheres have a conductivity of 0.1 to 100 $S \cdot cm^{-1}$, preferably 10 to 100 $S \cdot cm^{-1}$.

The present disclosure also provides a method for preparing porous carbon nanotube microspheres, comprising: dispersing carbon nanotubes in a solvent to form a dispersion without the assistance of surfactant, followed by spray drying the dispersion, to prepare porous carbon nanotube microspheres.

The morphology of the carbon nanotube microsphere material of the present disclosure may be powdery or particulate.

More particularly, as one of feasible embodiments of the present disclosure (refer to FIG. 1), the preparation method may comprise: dispersing carbon nanotubes in a solvent to obtain a dispersion free of surfactant in a liquid feed tank 10; then feeding the dispersion into a centrifugal spray nozzle 7 of a spray dryer via a filter 5 and a pump 6, and forming minute atomized liquid droplets; allowing the atomized liquid droplets to be in contact in a cocurrent flow manner with an hot airflow formed by an air filter 1, a heater 2, and a hot air dispenser 3 in the spray dryer (herein, the transient hot airflow temperature is the air inlet temperature of material), and to enter a drying tower 4 (herein, the drying temperature of material is the air outlet temperature of material); rapidly evaporating the solvent in the atomized liquid droplets, such that carbon nanotubes in the atomized liquid droplets are aggregated to form carbon nanotube microspheres; and then collecting the carbon nanotube microspheres from the bottom of the drying tower 4 of the spray dryer and/or a cyclone separator 8 and withdrawing hot air by an air fan 9.

In a typical embodiment, the preparation method may comprise the following steps:

A. dispersing carbon nanotubes into a dispersion solvent (free of surfactant) by ultrasonic treatment, to obtain a carbon nanotube dispersion;

B. spraying the dispersion obtained in step A through a spray nozzle of a spray dryer at a certain speed, presetting the air inlet temperature and the air outlet temperature, maintaining the solution in a stirring state in the process of spraying, and adjusting the speed of liquid injection in view of different models of spray dryers; and C. naturally cooling, thereby obtaining desired porous carbon nanotube microspheres.

Preferably, the conditions for the aforementioned spray drying include an air inlet temperature of 150 to 250° C. and an air outlet temperature which may be adjusted according to practical situations, for example 75° C. or more, such as 75 to 150° C., or 90° C. or more; and particularly preferred conditions for spray drying include an air inlet temperature of 190 to 210° C. and an air outlet temperature of 90 to 110° C.

Further, the conditions for spray drying may further preferably include a spray speed of 1 milliliter/hour to 10000 liters/hour, preferably 1 milliliter/minute to 100 liters/minute, which is particularly adjusted according to different models and specifications of spray dryers.

Preferably, the aforementioned carbon nanotubes may be selected from normal carbon nanotubes, carboxylated carbon nanotubes, hydroxylated carbon nanotubes, aminated carbon nanotubes, etc.

Preferably, the dispersion contains carbon nanotubes in a concentration of 10 to 50 g/L. Further preferably, the dispersion contains carbon nanotubes in a concentration of 10 to 15 g/L.

Further, the aforementioned solvent is an organic and/or inorganic liquid which allows carbon nanotubes to be uniformly dispersed, for example, preferably any one of water, aqueous ammonia, hydrochloric acid solution, ethanol, acetone, and isopropanol, or a combination thereof.

In a more particular preferred embodiment, the solvent may be a mixture of ethanol and water at a volume ratio of 1:10.

By the way, the spray dryer in the present disclosure is a generic name of a class of apparatuses which may allow a liquid material to be atomized by spraying and to be rapidly contacted with a high-temperature heat source environment such that a fixed morphology is obtained and a finished product is formed by drying. The spray dryer is not limited to the structure shown in FIG. 1 and may also be any other apparatus having a similar function known in the art.

In the present disclosure, spray drying, which is a conventional technique, is inventively used in the preparation of porous carbon nanotube microspheres by the inventors. During the evaporating process of liquid droplets, carbon nanotubes dispersed therein are aggregated under the action of shrinkage of liquid droplets, but after being aggregated to certain extent, further compression is prevented due to the good mechanical strength possessed by the carbon nanotubes themselves. Thereby, a porous microspherical structure formed by interlacing and stacking carbon nanotubes is obtained, which has a certain size and porosity, and the interior of the microsphere is filled with nanoscale gaps. In the present disclosure, carbon nanotube microspheres can be obtained by merely performing spray drying using carbon nanotubes and a conventional dispersion solvent, which greatly simplifies the preparation process of carbon nanotube microspheres and reduces production cost. Furthermore, the carbon nanotube microspheres obtained have a regular particle size and a controllable size, and have good mechanical strength, conductive property, and porosity, and therefore can be used as an extended material of carbon nanotubes for wide use in fields of electrode material, medical delivery, etc.

For example, the aforementioned porous carbon nanotube microspheres may be used in the preparation of batteries, supercapacitors, etc., for example, lithium-sulfur battery electrodes, supercapacitor electrodes, or fuel cell electrodes.

As one of embodiments thereof, the aforementioned porous carbon nanotube microspheres are used to prepare an electrode material. For example, the porous carbon nanotube microspheres may be mixed with sulfur, etc. in a manner known in the art, to form a sulfur-carbon composite, which is then combined with carbon black, acetylene black, and other auxiliary material such as an excipient and a binder, to prepare a slurry. The slurry is then coated onto a current collector such as an aluminum foil, etc., to form a positive electrode material which can be used in a lithium-sulfur battery. Such positive electrode material may be subsequently combined with a negative electrode material, an electrolyte, etc. to form a primary and secondary lithium battery, etc.

As another embodiment, the aforementioned porous carbon nanotube microspheres are combined with carbon black, acetylene black, and other auxiliary material such as an excipient and a binder to prepare a slurry, and then coated onto a base material such as aluminum foil, etc., to form an electrode. This electrode may be subsequently combined with another electrode, a separator, an electrolyte, etc. to form a supercapacitor.

Embodiments in Second Aspect

The second aspect of this disclosure relates to a lithium metal-skeleton carbon composite, comprising a porous carbon material carrier and lithium metal formed in pores of the carbon material carrier.

The skeleton structure of the carbon material described above may be a microspherical structure (average pore size of 10 to 50 nm) composed of materials such as carbon fiber, carbon nanotubes, etc., and acetylene black may also be used. Other carbon skeleton materials having an average pore size in a range of 10 to 100 nm may also be used as a carrier for absorbing melted lithium metal.

The mass of the lithium metal in the lithium metal-skeleton carbon composite comprises typically 5% to 80%, more preferably 30% to 50%.

Preferably, microspheres prepared by spray drying carbon nanotubes are used as the carbon material skeleton. The microspheres are mainly spherical or spheroidal particles composed of carbon nanotubes, wherein the spherical or spheroidal particles have an average diameter of 1 µm to 100 µm, preferably 1 µm to 25 µm. The porous carbon nanotube microsphere material may have any one of a minute spherical solid aggregated structure, a spherical aggregated structure, a spheroidal aggregated structure, a porous spherical aggregated structure, and a donut-shaped aggregated structure, but is not limited thereto. The carbon nanotubes may be selected from, but not limited to, any one of multi-walled carbon nanotubes, double-walled carbon nanotubes, and single-walled carbon nanotubes, or a combination thereof. The carbon nanotubes may be selected from, but not limited to, any one of untreated pure commercial carbon nanotubes, purified carbon nanotubes free of catalyst, and surface-functionalized carbon nanotubes, or a combination thereof. For the aforementioned surface-functionalized carbon nanotubes, the group modifying on the surface of the carbon nanotube may be selected from, but not limited to, groups such as —COOH, —OH, —NH$_2$, etc. Pure carbon nanotubes free of catalyst, particularly pure multi-walled carbon nanotubes free of catalyst, are preferably used as the carbon nanotubes.

Further, by means of subjecting the porous carbon nanotube microspheres to a pressure test, it can be found that the tolerable pressure thereof ranges from 1 to 20 MPa, and the particle morphology is still maintained after a pressure test of 20 MPa.

The preparation method of porous carbon nanotube microspheres described above may comprise: dispersing carbon nanotubes in a solvent to form a dispersion without the assistance of surfactant, followed by spray drying the dispersion, to prepare the porous carbon nanotube microspheres.

The morphology of the porous carbon nanotube microsphere material may be powdery or particulate.

More particularly, as one of feasible embodiments of the present disclosure, the preparation method may comprise: dispersing carbon nanotubes in a solvent to obtain a dispersion free of surfactant; then feeding the dispersion into an atomizer of a spray dryer and forming minute atomized liquid droplets; allowing the atomized liquid droplets to be in contact with a hot airflow in a cocurrent flow manner in the spray dryer; rapidly evaporating the solvent in the atomized liquid droplets, such that carbon nanotubes in the atomized liquid droplets are aggregated to form porous carbon nanotube microspheres; and then discharging the porous carbon nanotube microspheres from the bottom of a drying tower of the spray dryer and/or a cyclone separator.

In a typical embodiment, the preparation method may comprise the following steps:

A. dispersing carbon nanotubes into a dispersant (free of surfactant) to obtain a carbon nanotube dispersion;

B. spraying the dispersion obtained in step A through a spray nozzle of a spray dryer at a certain speed, presetting the air inlet temperature and the air outlet temperature, maintaining the solution in a stirring state in the process of spraying, and adjusting the speed of liquid injection in view of different models of spray dryers; and C. naturally cooling, thereby obtaining desired porous carbon nanotube microspheres.

Preferably, the aforementioned conditions for the spray drying include an air inlet temperature of 150 to 250° C. and an air outlet temperature of 75 to 150° C.; and particularly preferred conditions for spray drying include an air inlet temperature of 190 to 210° C. and an air outlet temperature of 90 to 110° C.

Further, the conditions for spray drying may further preferably include a spray speed of 1 milliliter/minute to 100 liters/minute, which is particularly adjusted according to different models and specifications of spray dryers.

Preferably, the aforementioned carbon nanotubes may be selected from normal carbon nanotubes, carboxylated carbon nanotubes, hydroxylated carbon nanotubes, aminated carbon nanotubes, etc.

Preferably, the dispersion contains carbon nanotubes in a concentration of 10 to 50 g/L. Further preferably, the dispersion contains carbon nanotubes in a concentration of 10 to 15 g/L.

Further, aforementioned solvent employed is an organic and/or inorganic liquid which allows carbon nanotubes to be uniformly dispersed, for example, preferably any one of water, aqueous ammonia, hydrochloric acid solution, ethanol, acetone, and isopropanol, or a combination thereof.

In a more particular preferred embodiment, the solvent may be a mixture of ethanol and water at a volume ratio of 1:10.

The second aspect of this disclosure also relates to a preparation method of a metal-skeleton carbon composite, comprising: uniformly mixing a metal in a melted state with a porous carbon material carrier, followed by cooling, to obtain a metal-skeleton carbon composite.

The metal described above is a metal having a melting point lower than the temperature at which the porous carbon material carrier is thermally damaged or is subjected to phase transition, for example lithium, sodium, potassium, tin, etc.

For example, the preparation method for a lithium metal-skeleton carbon composite specifically comprises:

first step (selecting and preparing a skeleton carbon material): selecting a porous carbon material having different pore sizes as a carrier for absorbing lithium metal, wherein a porous carbon material having a pore size in a range of 10 to 100 nm (preferably 10 to 50 nm) is preferred, wherein the preparation of the porous carbon material is most preferably a spray drying method for preparing porous carbon nanotube microspheres;

second step: weighing lithium metal (battery grade) and the skeleton carbon material at a certain ratio;

third step: placing both of them in a reactor filled with argon gas;

fourth step: heating the reactor to a temperature higher than the melting point of the lithium metal;

fifth step: performing stirring in the process of thermal melting of the lithium metal; sixth step: cooling to room temperature after the mixing is finished, to obtain a lithium metal-skeleton carbon composite.

The lithium metal, after being melted by heating, is absorbed by the skeleton carbon material into the pores of the skeleton carbon material. Similarly, low-melting metals, such as sodium, potassium, tin, etc., may also be absorbed into the carbon material skeleton.

In order to enable objects, technical solutions, and advantages of the present disclosure to be more clear, specific Examples of the present disclosure will be illustrated in details below in conjunction with accompanying drawings. The embodiments shown in accompanying drawings and described according to the accompanying drawings are merely exemplary, and the present disclosure will be not limited to these embodiments.

Here, it is to be indicated that in order to prevent the present disclosure from being blurred due to unnecessary details, only the structures and/or processing steps closely related to the solutions according to the present disclosure are shown in the accompanying drawings, and other details less related to the present disclosure are omitted.

Example 1

Figure 2A:
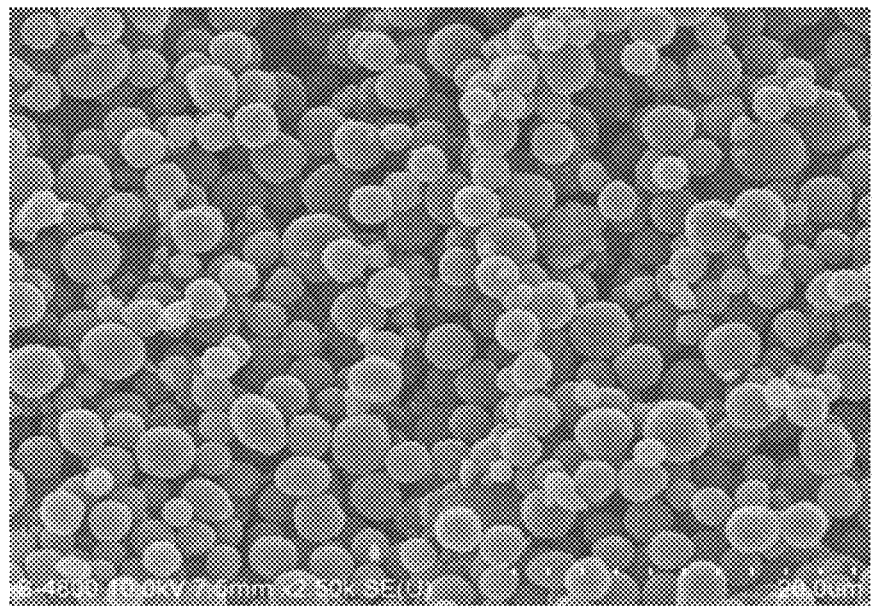
FIG. 2a to FIG. 2b are a SEM image of carboxylated carbon nanotube microspheres obtained in Example 1 and a comparison diagram of porosities of carboxylated carbon nanotube microspheres and non-spherized carbon nanotubes, respectively. It can be seen from the curves in FIG. 2b that when the carboxylated carbon nanotubes are converted to carboxylated carbon nanotube microspheres, the average pore volume of the carboxylated carbon nanotube microspheres are increased compared to that of the pure carboxylated carbon nanotubes.
Figure 2B:
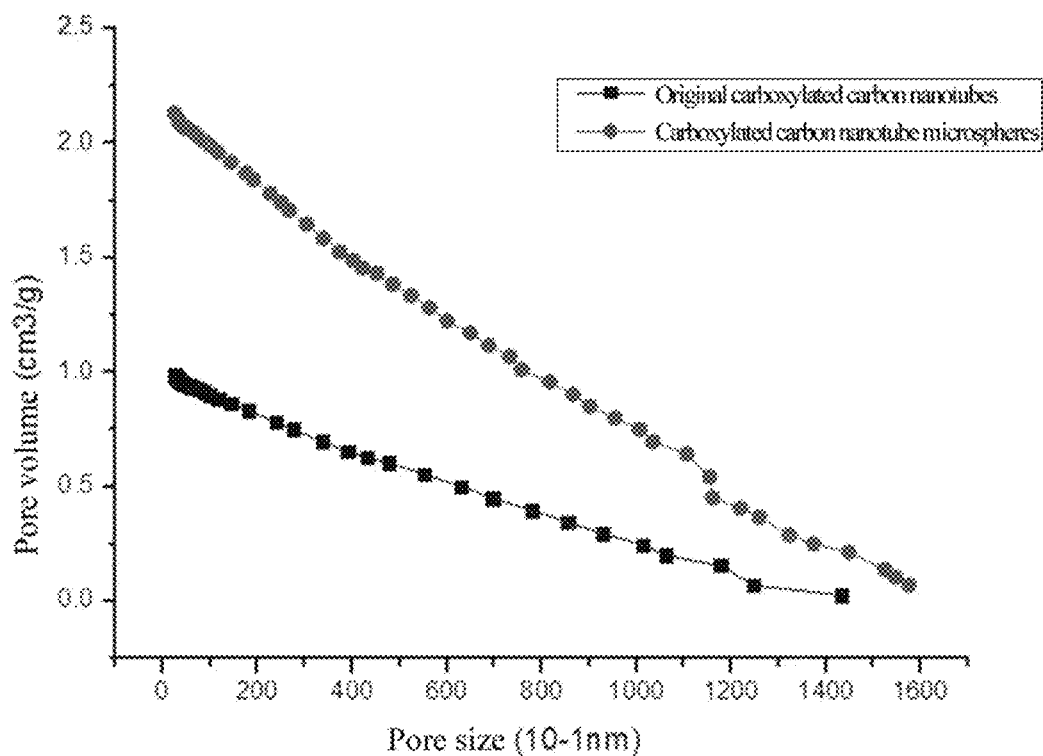
Figure 3:
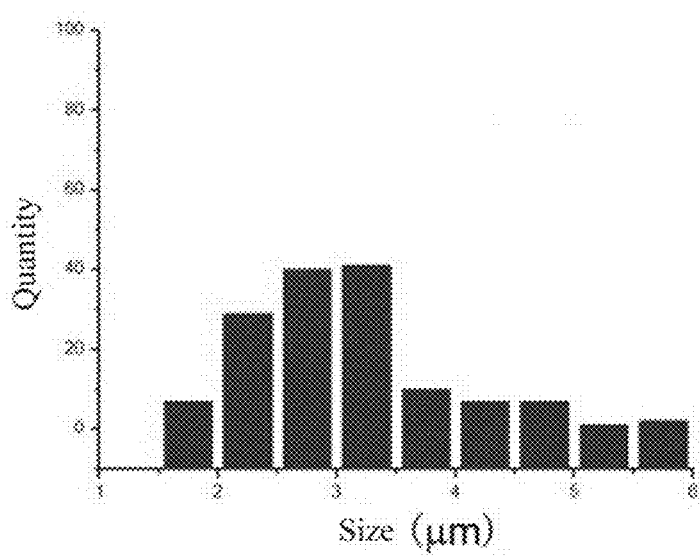
FIG. 3 is a statistic graph of the particle size distribution of carboxylated carbon nanotube microspheres prepared by using a dispersion of carboxylated carbon nanotubes at a concentration of 10 g/L.

4 g of multi-walled carbon nanotubes with a carboxyl content of 3.86 wt % (model JCMT-95-8-20-COOH, Nanjing JCNANO Tech Co., Ltd.) were first added to 200 ml of deionized water, and 20 mL of 37% concentrated aqueous ammonia were further added. The sample was sealed and stirred, and allowed to be uniformly dispersed by performing a ultrasonic treatment with a 130 W ultrasonic probe for 10 hours. After that, the sample was added to a spray dryer (model YC-015, Shanghai Pilotech Instrument and Equipment Co., Ltd.). The air inlet temperature was set at 200° C., the air outlet temperature was set at 150° C., the spray pressure was set at 40 MPa, the feed amount was 500 mL/h, and a carboxylated carbon nanotube microsphere material was obtained after drying. The obtained sample was tested for specific surface area and pore size distribution. A SEM image of the carbon nanotube microsphere material was shown in FIG. 2*a*, and a comparison diagram of porosities of the carbon nanotube microspheres and non-spherized carbon nanotubes was shown in FIG. 2*b*. As seen from the curves obtained in the figure, when the carboxylated carbon nanotubes were converted to the carboxylated carbon nanotube microspheres, the pore size and the pore volume distribution were not significantly changed in pore size range tested, but the average pore volume of the carboxylated carbon nanotube microspheres was increased. This is because the moisture is rapidly evaporated in the process of spherization and there's not enough time for carboxylated carbon nanotubes, which are originally dispersed, to be re-bound back to the original compact structure, thereby forming more pore volume. And then, a particle size analysis was performed on the obtained carbon nanotube microspheres (also simply referred to as "microspheres" below), and the results thereof were shown in FIG. 3. The microspheres were subjected to a conductivity test, and it was found that the microspheres had a conductivity greater than 1000 S·m$^{-1}$; the microspheres were subjected to a pressure test, and it was found that the microspheres had a tolerable pressure of 1 to 20 MPa; the microspheres were subjected to a BET test, and it was found that the microspheres had a specific surface area of 294 m$^2$/g and a pore size distribution of 1 to 180 nm.

Example 2

Figure 4A:
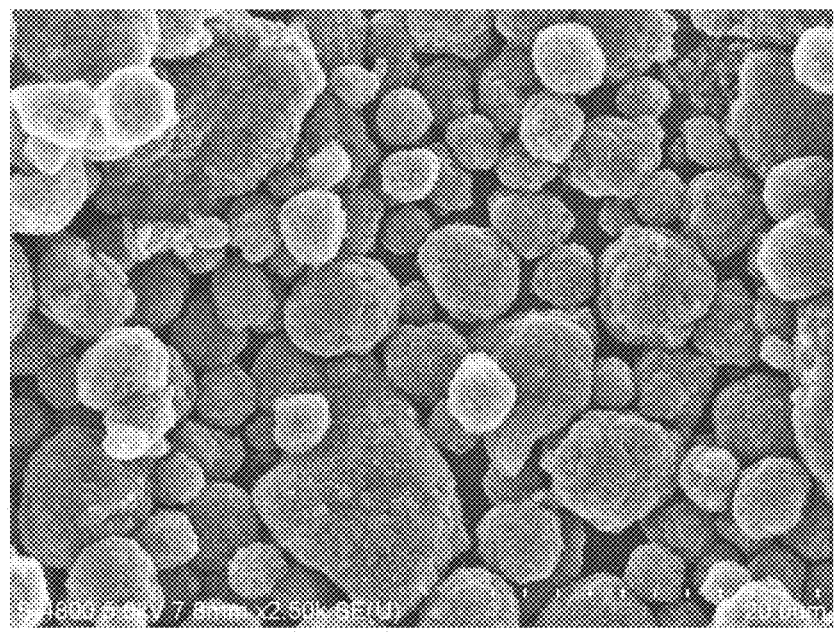
FIGS. 4a, 4b, and 4c are a SEM image of untreated porous multi-walled carbon nanotube microspheres obtained in Example 2, a cross-section view of the untreated porous multi-walled carbon nanotube microspheres, and a comparison diagram of porosities of the untreated porous multi-walled carbon nanotube microspheres and non-spherized carbon nanotubes, respectively.
Figure 4B:
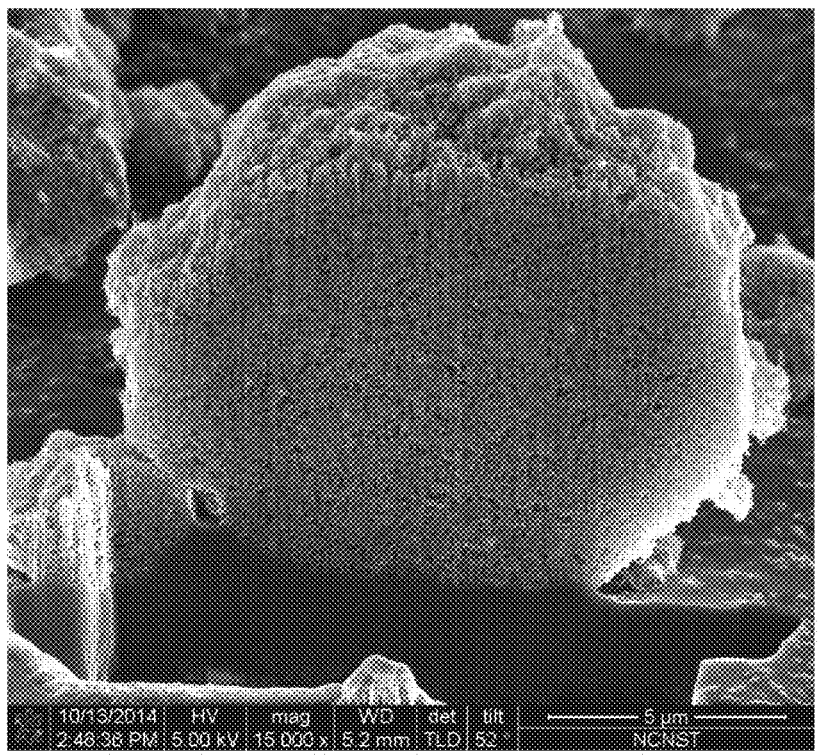
Figure 4C:
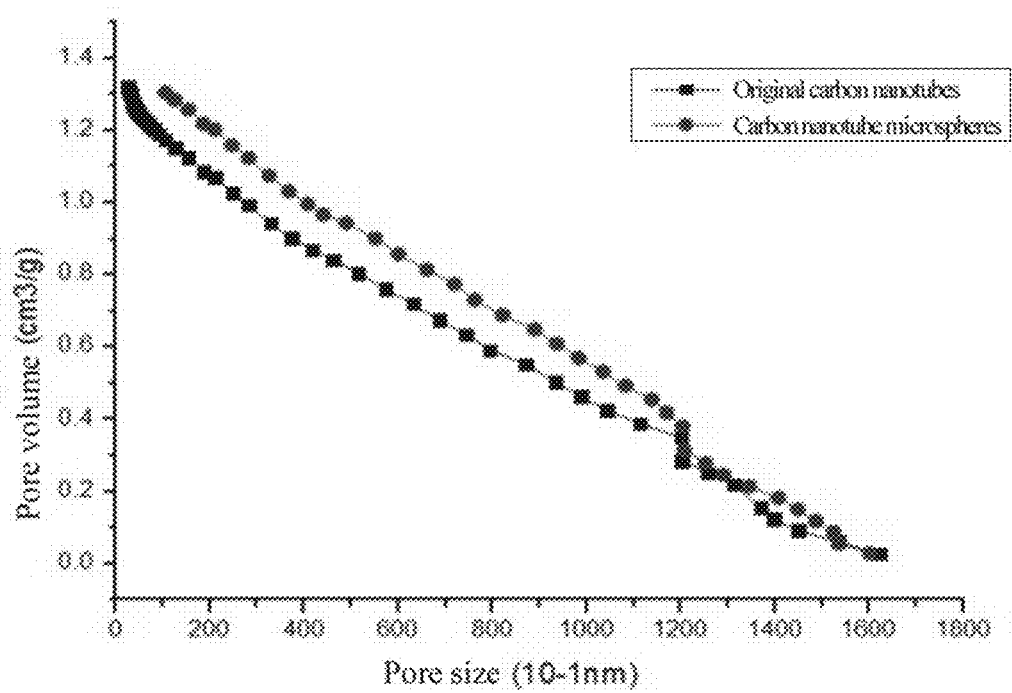
Figure 5:
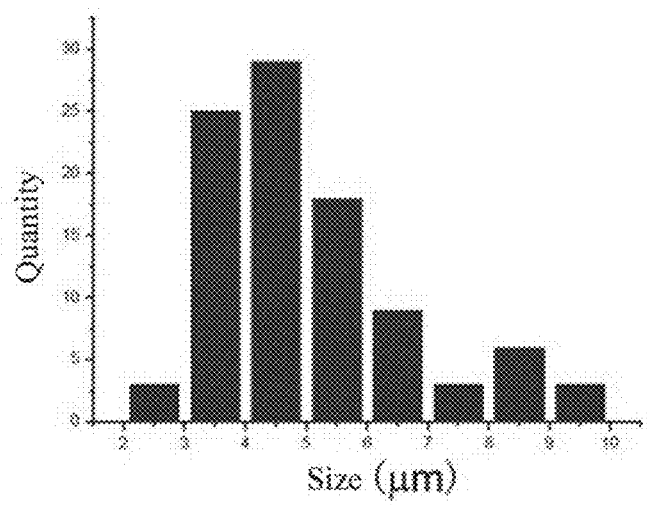
FIG. 5 is a statistic graph of the particle size distribution of porous multi-walled carbon nanotube microspheres, which are not subjected to any chemical treatment, obtained in Example 2.

4 g of multi-walled carbon nanotubes which were not subjected to any chemical treatment (model JCMT-95-30-17, Nanjing JCNANO Tech Co., Ltd.) were first added to 200 ml of deionized water, and 20 mL of absolute ethanol were further added. The sample was sealed and stirred, and allowed to be uniformly dispersed by performing a ultrasonic treatment with a 130 W ultrasonic probe for 10 hours. After that, the sample was added to a spray dryer (model YC-015, Shanghai Pilotech Instrument and Equipment Co., Ltd.). The air inlet temperature was set at 200° C., the air outlet temperature was set at 150° C., the spray pressure was set at 40 MPa, the feed amount was set at 500 mL/h, and a carbon nanotube microsphere material was obtained after drying. The obtained sample was tested for the specific surface area and the pore size distribution. A SEM photograph of untreated pure multi-walled carbon nanotube microspheres was shown in FIG. 4*a*, a SEM photograph of a particle section obtained by cutting a untreated pure carbon nanotube microsphere with ion beam was shown in FIG. 4*b*, and a comparison diagram of porosities of untreated pure multi-walled carbon nanotube microspheres and non-spherized untreated pure multi-walled carbon nanotubes was shown in FIG. 4*c*, which were similar to Example 1, except that the porous carbon nanotube microspheres formed by untreated multi-walled carbon nanotubes after spray drying had a larger pore volume. The reason may be that normal carbon nanotubes have a slightly poor dispersibility compared to carboxylated carbon nanotubes and thus fail to form a more desirable dispersion state when dispersed in water, and therefore there are more pores formed by interlacing carbon nanotubes each other in the interior of microspheres obtained by spray drying. After that, a particle size analysis was performed on the obtained microspheres, and the results thereof were shown in FIG. 5. The microspheres were subjected to a conductivity test, and it was found that the microspheres had a conductivity of 1600 S·m$^{-1}$; the microspheres were subjected to a pressure test, and it was found that the microspheres had a tolerable pressure of 1 to 30 MPa; the microspheres were subjected to a BET test, and it was found that the microspheres had a specific surface area of 158 m$^2$/g and a pore size distribution of 1 to 160 nm.

Example 3

Figure 6:
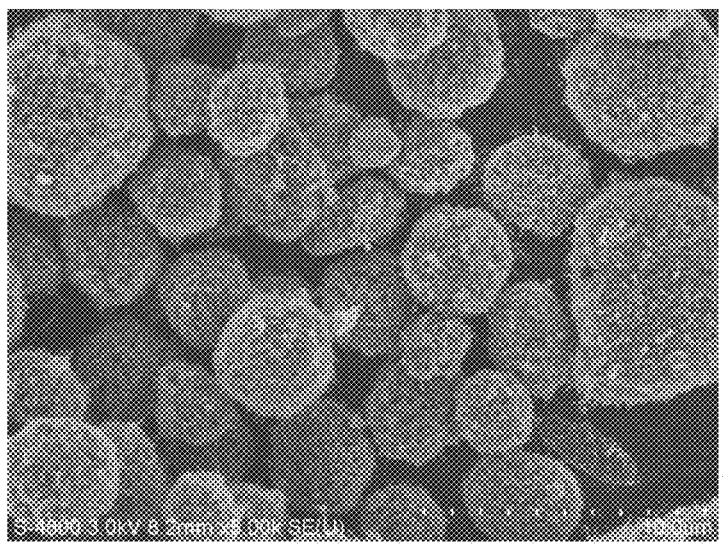
FIG. 6 is a SEM image of hydroxylated multi-walled carbon nanotube microspheres obtained in Example 3.

4 g of multi-walled carbon nanotubes with a hydroxyl content of 3.86% (model JCMT-95-8-20-COOH, Nanjing JCNANO Tech Co., Ltd.) were first added to 200 ml of deionized water, and 20 mL of 37% concentrated aqueous ammonia were further added. The sample was sealed and stirred, and allowed to be uniformly dispersed by performing a ultrasonic treatment with a 130 W ultrasonic probe for 10 hours. After that, the sample was added to a spray dryer (model YC-015, Shanghai Pilotech Instrument and Equipment Co., Ltd.). The air inlet temperature was set at 200° C., the air outlet temperature was set at 150° C., the spray pressure was set at 40 MPa, the feed amount was 500 mL/h, and a hydroxylate carbon nanotube microsphere material was obtained after drying, and the morphology and the particle size thereof were shown in FIG. 6. The microspheres were subjected to a conductivity test, and it was found that the microspheres had a conductivity greater than 1000 $S·m^{-1}$; the microspheres were subjected to a pressure test, and it was found that the microspheres had a tolerable pressure of 1 to 20 MPa; and the microspheres were subjected to a BET test, and it was found that the microspheres had a specific surface area of 161 $m^2/g$ and a pore size distribution of 1 to 165 nm.

Example 4

Figure 7:
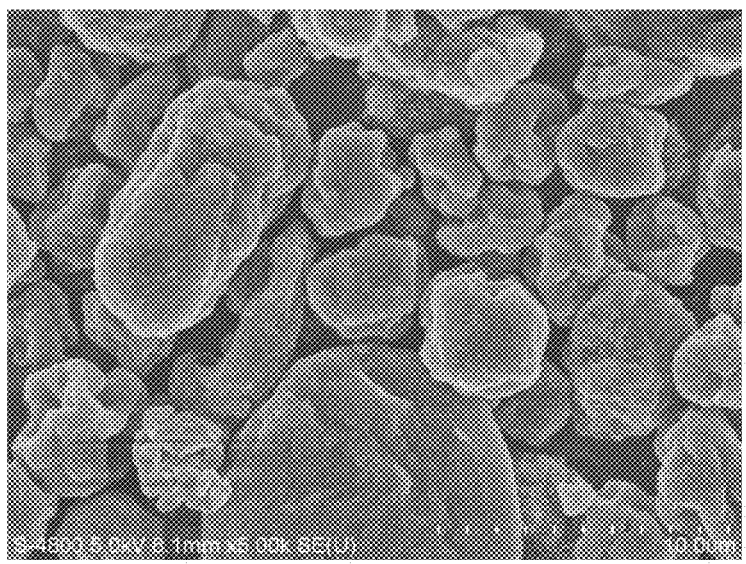
FIG. 7 is a SEM image of a carbon-sulfur composite prepared in Example 4.

4 g of normal multi-walled carbon nanotubes were first added to 200 mL of deionized water, and 20 mL of absolute ethanol were further added. The sample was sealed and stirred, and allowed to be uniformly dispersed by performing a ultrasonic treatment with a 130 W ultrasonic probe for 10 hours. After that, the sample was added to a spray dryer. The air inlet temperature was set at 200° C., the air outlet temperature was set at 150° C., the spray pressure was set at 40 MPa, the feed amount was 500 mL/h, and porous carbon nanotube microspheres were obtained after drying. The morphology and the particle size of the microspheres can be referred to FIG. 4a and the porosity thereof was substantially similar to that of Example 2. This material and sulfur were mixed at a mass ratio of 1:4, placed in a vacuum muffle furnace, and heated to 300° C. at a temperature increase rate of 5° C./min, and then the temperature was maintained for 3 hours. After naturally cooling to room temperature, a sulfur-carbon composite was obtained and the morphology thereof was shown in FIG. 7.

Figure 8A:
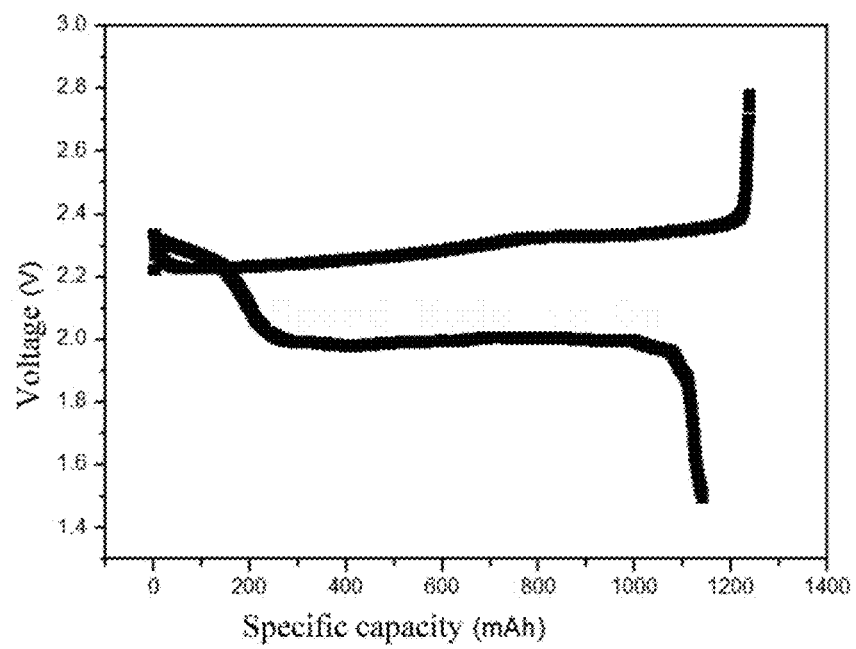
FIGS. 8a and 8b show charge-discharge curves of the first cycle and a battery cycling performance graph of the carbon-sulfur composite prepared in Example 4, respectively.
Figure 8B:
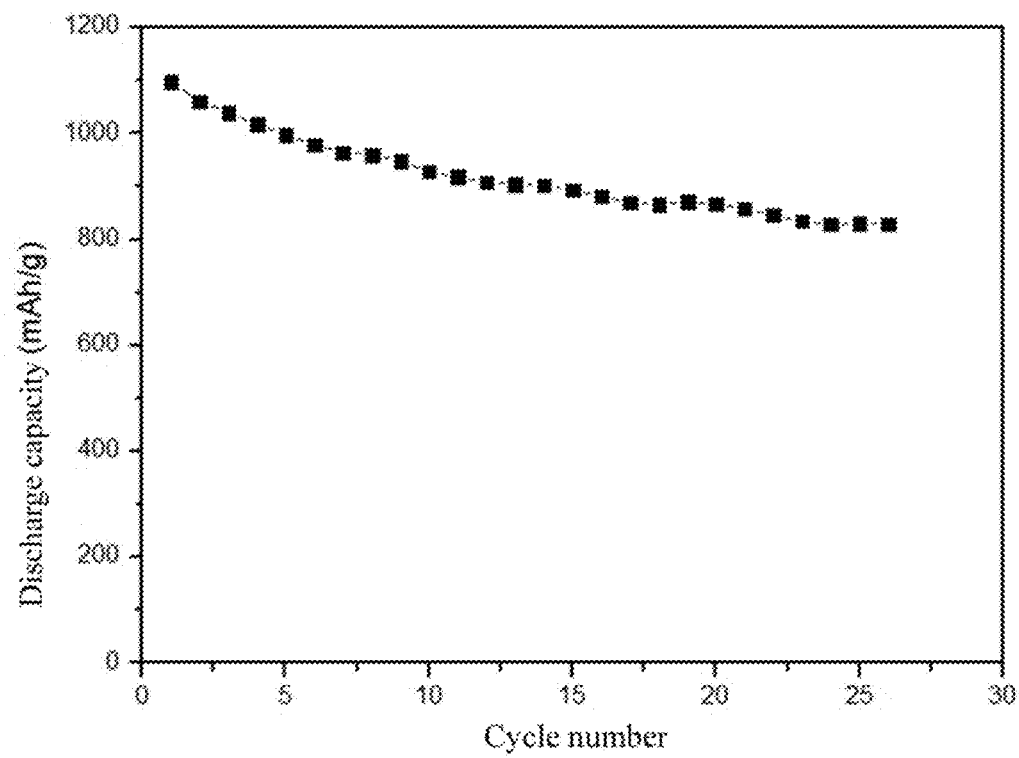

An electrode was produced with this sulfur-carbon composite according to the following method:

The sulfur-carbon composite, acetylene black and LA132 (a binder, Chengdu Indigo Power Sources Co., Ltd.) were weighted at a mass ratio of 70:20:10, uniformly ground, and then coated on an aluminum foil with a 150 μm doctor blade to produce an electrode. And a simulated battery was assembled by using a lithium metal foil as a negative electrode, 1 mol/L LiTFSI (lithium trifluoromethylsulfonimide)/DOL-DME (1,3-dioxolane-dimethoxyethane) (in a volume ratio of 1:1) as an electrolyte, and a polypropylene microporous thin film as a separator (Celgard 2300). With reference to FIGS. 8a-8b, the battery was charged and discharged at a current density of 0.25 $A·g^{-1}$ and a voltage in a range of 1.5 to 2.8V. The first discharge performance is up to 1139 mAh/g, and after 50 cycles, the capacity is maintained at 879 mA/g and the efficiency is also up to 85% or more.

Example 5

4 g of multi-walled carbon nanotubes which were not subjected to any chemical treatment were first added to 200 ml of deionized water, and 20 mL of absolute ethanol were further added. The sample was sealed and stirred, and allowed to be uniformly dispersed by performing a ultrasonic treatment with a 130 W ultrasonic probe for 10 hours. After that, the sample was added to a spray dryer. The air inlet temperature was set at 200° C., the air outlet temperature was set at 150° C., the spray pressure was set at 40 MPa, the feed amount was set at 500 mL/h, and a porous carbon nanotube microsphere material was obtained after drying, with the morphology thereof being substantially similar to that of Example 2. The microspheres were subjected to a conductivity test, and it was found that the microspheres had a conductivity of $2.60*10^{-2}$ $S·cm^{-1}$; the microspheres were subjected to a pressure test, and it was found that the microspheres had a tolerable pressure of 1 to 20 MPa; and the microspheres were subjected to a BET test, and it was found that the microspheres had a specific surface area of 294 $m^2/g$ and a pore size distribution of 1 to 180 nm.

Figure 9:
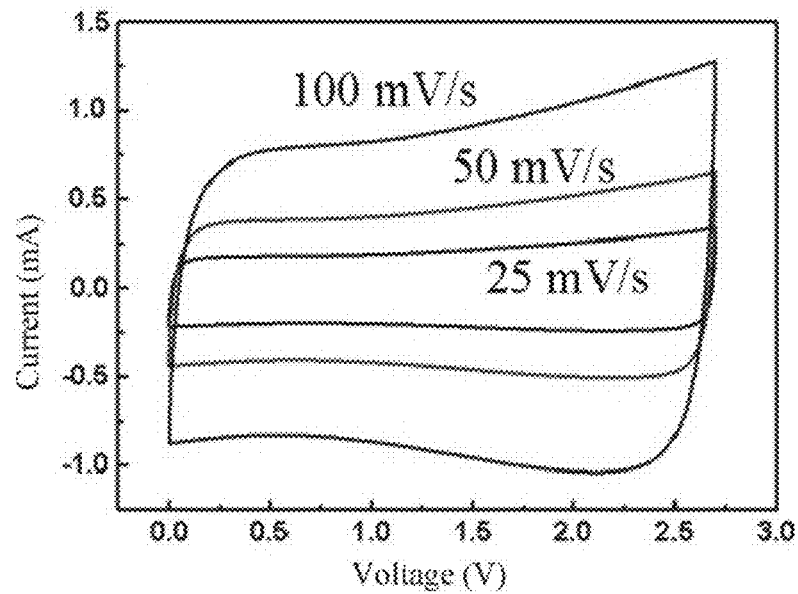
FIG. 9 is a cyclic voltammetric plot of a carbon nanotube microsphere supercapacitor prepared in Example 5.
Figure 10:
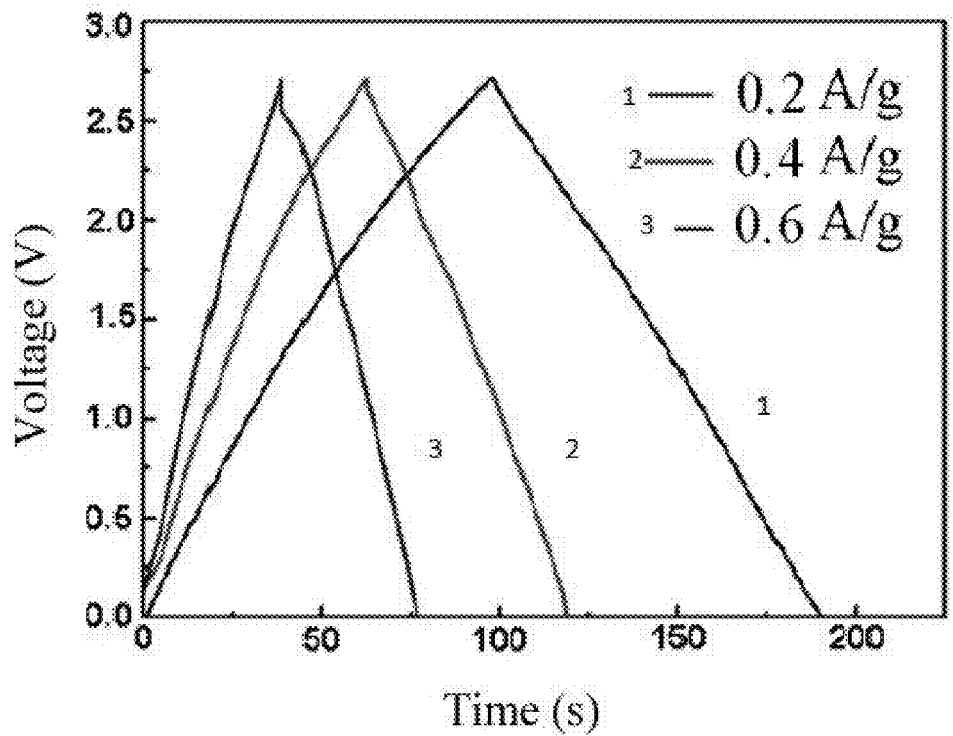
FIG. 10 shows charge-discharge curves of the carbon nanotube microsphere supercapacitor prepared in Example 5.

A button-type supercapacitor was assembled with the carbon nanotube microsphere material obtained in this Example according to the following method:

The carbon nanotube microsphere material, acetylene black as a conductive agent, PVDF (polyvinylidenfluoride) as a binder were mixed at a mass ratio of 8:1:1; an appropriate amount of NMP (N-methylpyrrolidone) was added, and the resultant was uniformly stirred, then coated on an aluminum foil with a 150 μm doctor blade, and dried by placing in an oven at 80 degrees for 6 hours. Two electrodes having similar masses were selected to assemble a capacitor, with 1 mol/L $Et_4BNF_4$ (tetraethylammonium tetrafluoroborate)/PC (propylene carbonate) being used as an electrolyte and a cellulose film being used as a separator. After the simulated capacitor was activated by leaving standing, electrochemical performance test was performed. Cyclic voltammetric curves of this capacitor at scan rates of 25 mV/s to 100 mV/s were shown in FIG. 9. It was found that the curves were well symmetrical and basically exhibited capacitance characteristics. Charge-discharge curves of this capacitor at a current density in a range of 0.2 A/g to 0.6 A/g and a voltage in a range of 0 to 2.7 V were shown in FIG. 10. Each of the curves exhibited a distribution of an approximately symmetrical triangle, indicating a good reversibility of electrochemical reaction of the electrode, and it was obtained by calculation that the specific capacitance at this current density was 16.8 F/g.

Example 6

200 mg of battery grade lithium metal (Chongqing Kunyu Lithium Co., Ltd.) and 200 mg of commercial porous carbon having an average pore size of 2.6 nm (porous carbon JCAC-2000) were first weighed and placed in a heating reactor inert to lithium metal, and then were heated to a temperature at which lithium metal was melted, under the protection of argon gas, and vigorously stirred for several minutes. It was found in the process of mixing that the porous carbon cannot be used as a carrier for absorbing the melted lithium metal, and the composite formed was lump-like, indicating that the average pore size was too small to effectively absorb the melted lithium metal.

Example 7

200 mg of battery grade lithium metal (Chongqing Kunyu Lithium Co., Ltd.) and 200 mg of commercial acetylene black having an average pore size of 14.4 nm (Alfa Aeser Reagent Corporation) were first weighed and placed in a heating reactor inert to lithium metal, and then were heated to a temperature at which lithium metal was melted, and vigorously stirred for 6 to 8 minutes. After the mixing was finished, the temperature was lowered to room temperature. The whole process was performed in an argon gas atmosphere.

The lithium metal-acetylene black microspheres obtained had a lithium metal loaded amount of 8.0%, which was measured by weighing and comparing with the weight of acetylene black microspheres which did not absorb lithium metal.

Figure 11:
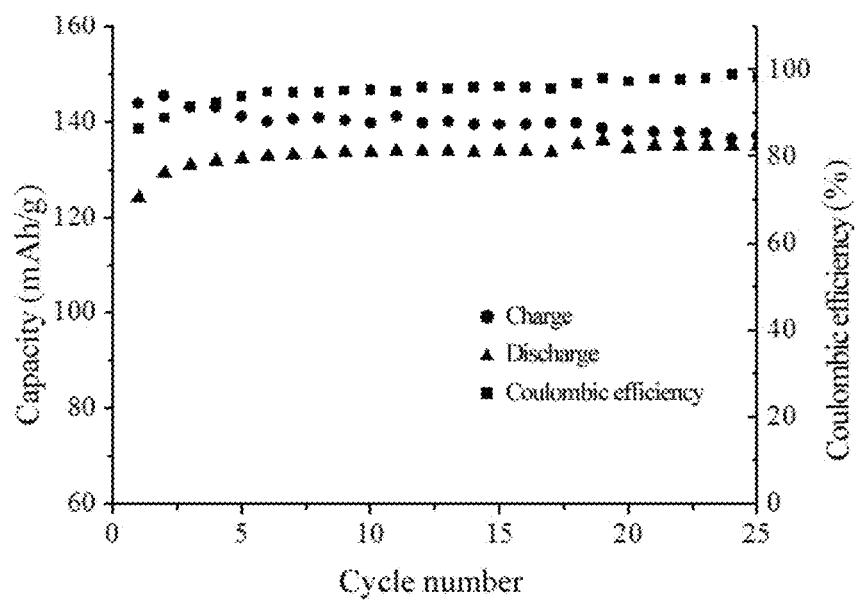
FIG. 11 shows a charge-discharge cycling performance graph of a battery composed of a lithium metal-acetylene black composite and lithium iron phosphate obtained in Example 7 of the present disclosure.

The material obtained above was used as a negative electrode of a lithium battery:

For the lithium ion battery, a positive electrode material of LiFePO$_4$:PVFD:AB=88:5:7 (PVDF: polyvinylidenfluoride; AB: conductive carbon black) with a thickness of 150 μm and an electrolyte of 1 mol/L LiPF6/EC-DMC (1:1 vol) (EC: ethylene carbonate; DMC: dimethyl carbonate) were assembled together with the negative electrode to obtain a button-type battery (CR 2025). It was found over 25 cycles that the coulombic efficiency of the battery was not high in the whole process of cycling, and the coulombic efficiency tended to be stable as the cycling progressed. A schematic diagram of the charge-discharge performance of this battery over 25 cycles was shown in FIG. 11.

Example 8

Preparation of carbon nanotube microspheres: 2 g of multi-walled carbon nanotubes which were not subjected to any chemical treatment (Shanghai Pengxin New Materials Technology Co., Ltd.) were first added to 200 mL of deionized water, and 20 mL of absolute ethanol were further added. The sample was sealed and stirred, and allowed to be uniformly dispersed by performing a ultrasonic treatment with a 130 W ultrasonic probe for 10 hours. After that, the sample was added to a spray dryer. The air inlet temperature was set at 200° C., the air outlet temperature was set at 150° C., the spray pressure was set at 40 MPa, the feed amount was set at 500 mL/h, and a porous carbon nanotube microsphere material was obtained after drying. The microspheres were subjected to a nitrogen gas adsorption-desorption test, and it was found that the microspheres had a specific surface area of 151 m$^2$/g and an average pore size of 18.7 nm.

100 mg of battery grade lithium metal and 100 mg of porous carbon nanotube microspheres, which were obtained by spray drying of carbon nanotubes and had an average pore size of 18.7 nm, were weighed and placed in a heater inert to lithium metal, and then were heated to 220° C., a temperature higher than the melting point of the lithium metal, and stirred for 6 minutes. After the mixing is finished, the temperature was lowered to room temperature. The whole process was performed in an argon gas atmosphere.

The lithium metal-porous carbon nanotube microsphere composite obtained had a lithium metal loaded amount of 15.0%, which was measured by weighing and comparing with the weight of carbon nanotube microspheres which did not absorb lithium metal.

Figures 12A, 12B:
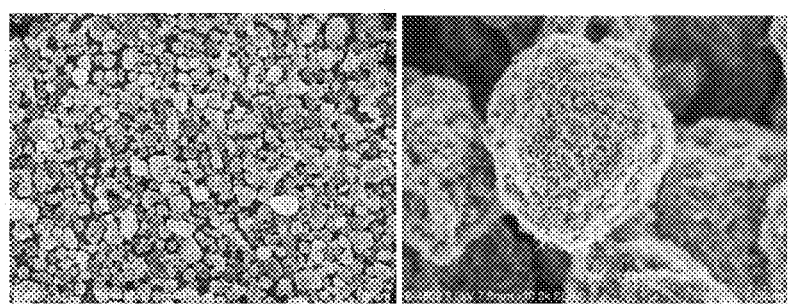
FIG. 12 shows SEM images of a lithium metal-porous carbon nanotube microsphere composite prepared in Example 8 of the present disclosure, wherein the magnification of FIG. 12a (left) is 500 times and that of FIG. 12b (right) is 10000 times.

A scanning electron microscope image of the lithium metal-porous carbon nanotube microsphere composite prepared was shown in FIG. 12. It can be seen that the material prepared had a microscale spherical structure.

Example 9

Preparation of carbon nanotube microspheres: 3 g of multi-walled carbon nanotubes which were not subjected to any chemical treatment (Shanghai Pengxin New Materials Technology Co., Ltd.) were first added to 200 mL of deionized water, and 20 mL of absolute ethanol were further added. The sample was sealed and stirred, and allowed to be uniformly dispersed by performing a ultrasonic treatment with a 130 W ultrasonic probe for 10 hours. After that, the sample was added to a spray dryer. The air inlet temperature was set at 200° C., the air outlet temperature was set at 120° C., the spray pressure was set at 40 MPa, the feed amount was set at 500 mL/h, and a carbon nanotube microsphere material was obtained after drying. The microspheres were subjected to a nitrogen gas adsorption-desorption test, and it was found that the microspheres had a specific surface area of 197 m$^2$/g and an average pore size of 22.9 nm.

100 mg of battery grade lithium metal and 100 mg of carbon nanotube microspheres, which were obtained by spray drying of carbon nanotubes and had an average pore size of 22.9 nm, were weighed and placed in a heater inert to lithium metal, and then were heated to 220° C., a temperature higher than the melting point of the lithium metal, and stirred for 6 minutes. After the mixing is finished, the temperature was lowered to room temperature. The whole process was performed in an argon gas atmosphere.

The lithium metal-porous carbon nanotube microsphere composite obtained had a lithium metal loaded amount of 35.0%, which was measured by weighing and comparing with the weight of carbon nanotube microspheres which did not absorb lithium metal.

Figure 13:
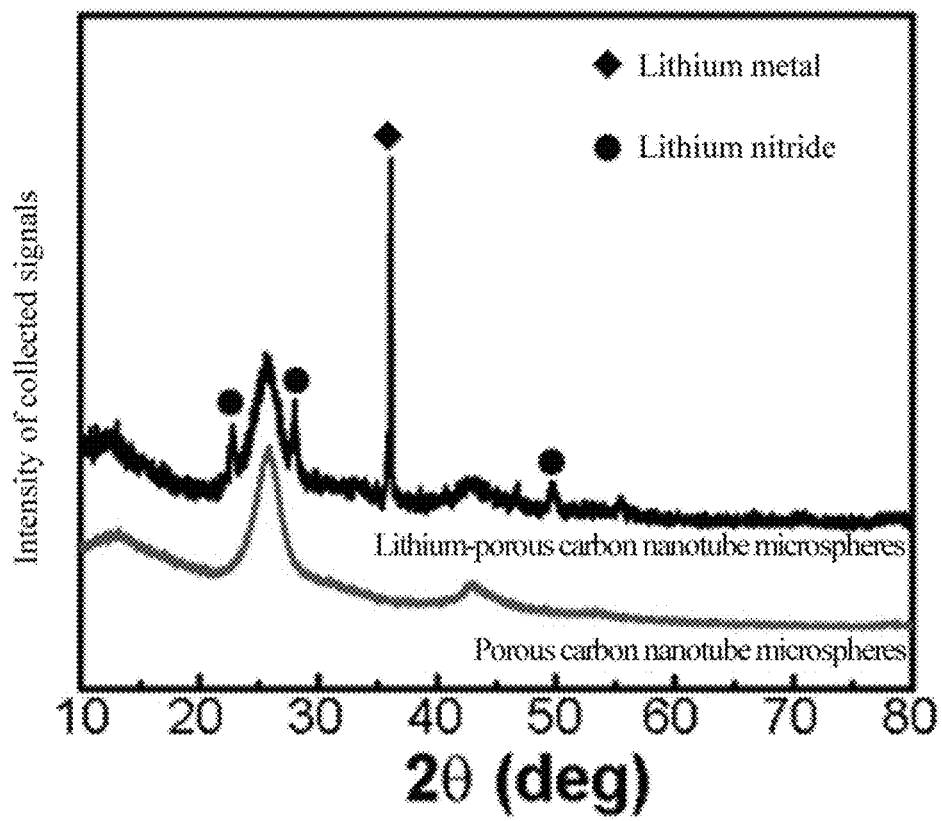
FIG. 13 shows X-ray powder diffraction patterns of a lithium metal-porous carbon nanotube microsphere composite (upper part) and porous carbon nanotube microspheres (lower part) obtained in Example 9 of the present disclosure, wherein a noticeable diffraction peak of lithium metal and a few impurity peaks of lithium nitride are contained.

An XRD pattern of the lithium metal-carbon nanotube microsphere composite prepared was shown in FIG. 13. It can be seen that the prepared material contained a large amount of elemental lithium metal and contained a few peaks of lithium nitride impurities as well.

Example 10

Preparation of porous carbon nanotube microspheres: 4 g of multi-walled carbon nanotubes which were not subjected to any chemical treatment (Shanghai Pengxin New Materials Technology Co., Ltd.) were first added to 200 mL of deionized water, and 20 mL of absolute ethanol were further added. The sample was sealed and stirred, and allowed to be uniformly dispersed by performing a ultrasonic treatment with a 130 W ultrasonic probe for 10 hours. After that, the sample was added to a spray dryer. The air inlet temperature was set at 200° C., the air outlet temperature was set at 150° C., the spray pressure was set at 40 MPa, the feed amount was set at 500 mL/h, and a porous carbon nanotube microsphere material was obtained after drying. The microspheres were subjected to a nitrogen gas adsorption-desorption test, and it was found that the microspheres had a specific surface area of 254 m$^2$/g and an average pore size of 31.4 nm.

Figure 14:
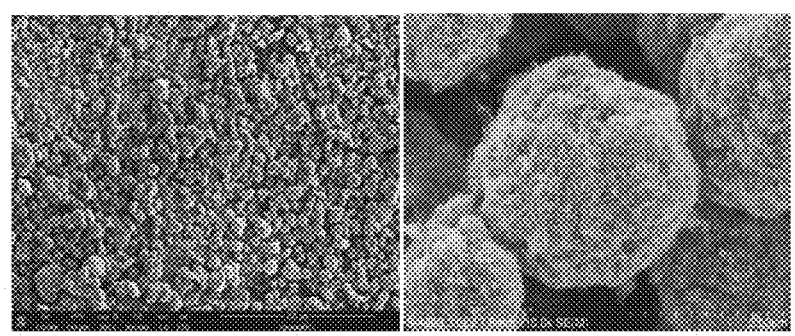
FIG. 14 shows SEM images of porous carbon nanotube microspheres obtained in Example 10 of the present disclosure, wherein the left graph has a magnification of 500 times and the right graph has a magnification of 10000 times.

A scanning electron microscope photograph of the porous carbon nanotube microspheres prepared by spray drying was shown in FIG. 14.

200 mg of battery grade lithium metal and 200 mg of carbon nanotube microspheres, which were obtained by spray drying of carbon nanotubes and had an average pore size of 31.4 nm, were weighed and placed in a heater inert to lithium metal, and then were heated to 220° C., a temperature higher than the melting point of the lithium metal, and stirred for 6 minutes. After the mixing is finished, the temperature was lowered to room temperature. The whole process was performed in an argon gas atmosphere.

The lithium metal-porous carbon nanotube microsphere composite obtained had a lithium metal loaded amount of 43.0%, which was measured by weighing and comparing with the weight of carbon nanotube microspheres which did not absorb lithium metal.

Figure 15:
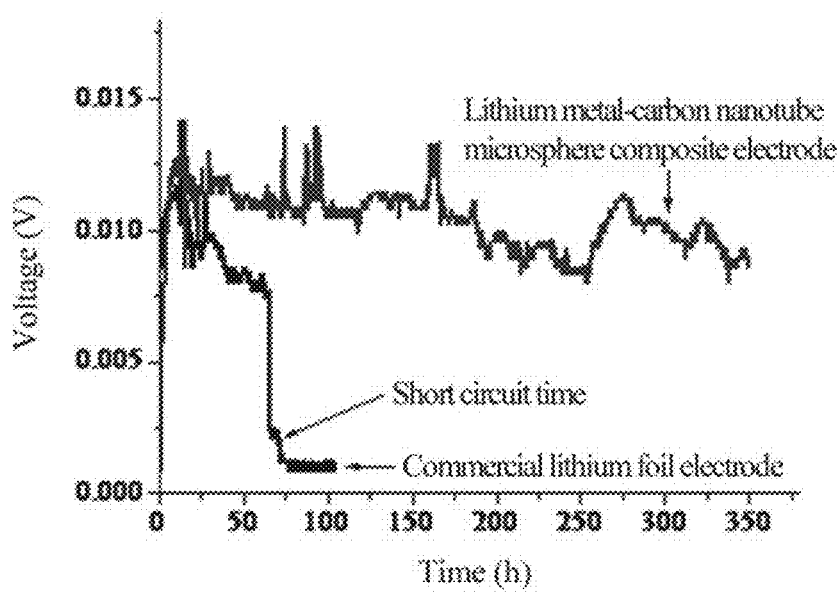
FIG. 15 shows a short circuit time of a battery composed of a lithium metal-porous carbon nanotube microsphere composite and a lithium metal foil obtained in Example 10 of the present disclosure, wherein this battery is tested for the short circuit time by charging at a constant current of 0.2 mA (a current density of 0.1 mA/cm$^2$), and the comparative experiment is a battery composed of a lithium metal foil and a lithium metal foil.

Lithium metal and lithium metal-porous carbon nanotube microsphere composite electrodes were used as working electrodes respectively, and composed half cells together with lithium metal foils. After that, lithium in the lithium metal foil was plated to the working electrode, and the formation time of dendrites was studied. As shown in FIG. 15, under the condition of the same current density of 0.1 mA/cm², there was no dendrite generated in the lithium metal-carbon nanotube microsphere composite electrode after 350 hours, because the effective electrode current density of the lithium metal-carbon nanotube microsphere composite electrode became very small due to the large specific surface area of its own (according to Sand time equation), and thus the formation time of dendrites may be delayed. Whereas the specific surface area of the lithium metal foil was much smaller, and dendrites were formed at the time of about 60 hours, resulting in short circuit of the battery.

Figure 16:
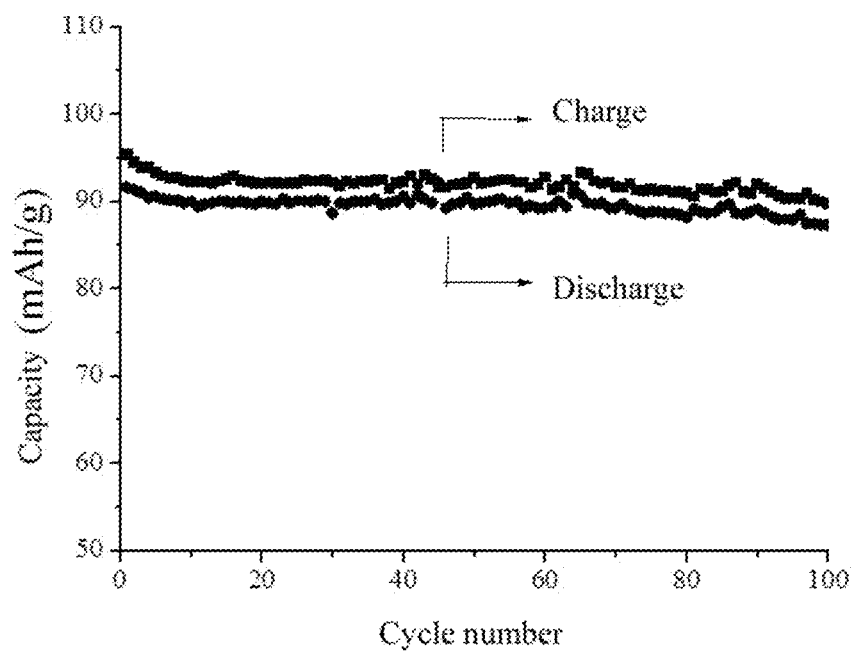
FIG. 16 shows a cycling performance graph of a simulated battery obtained in Example 10 of the present disclosure, in which a lithium metal-porous carbon nanotube microsphere composite is used as a negative electrode and spinel lithium manganate is used as a positive electrode.

The material obtained above was used as a negative electrode of a lithium battery:

For a lithium ion battery, a positive electrode material of LiMnO₄:PVFD:AB=88:5:7 with a thickness of 150 μm and an electrolyte of 1 mol/L LiPF6/EC-DMC (1:1 vol) were assembled together with the negative electrode to obtain a coin-type battery (CR 2025). 1 C current was used in charge and discharge, and the capacity of the battery had little loss over 100 cycles. A schematic diagram of the charge-discharge performance of this battery over 100 cycles was shown in FIG. 16.

Figure 17:
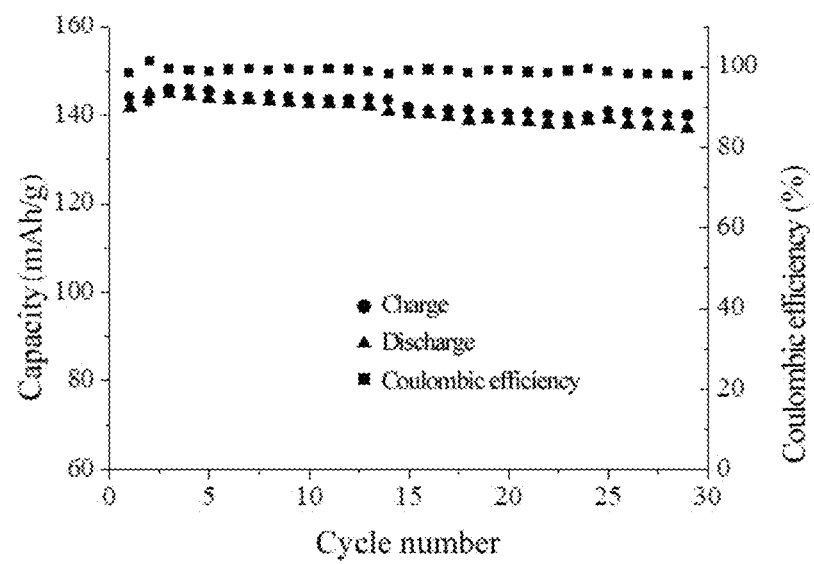
FIG. 17 shows a cycling performance graph of a battery composed of lithium metal-porous carbon nanotube microsphere composite and lithium iron phosphate obtained in Example 10 of the present disclosure.

For another lithium ion battery, a positive electrode material of LiFePO4:PVFD:AB=88:5:7 with a thickness of 150 μm and an electrolyte of 1 mol/L LiPF6/EC-DMC (1:1 vol) were assembled together with the negative electrode to obtain a coin-type battery (CR 2025). The specific capacity of the battery had little loss over 30 cycles. A schematic diagram of the charge-discharge performance of this battery over 30 cycles was shown in FIG. 17.

Example 11

200 mg of battery grade lithium metal and 200 mg of a commercial XE-2 carbon material having an average pore size of 10 nm (Qingdao Niusenke New Materials Co., Ltd.) were first weighed and placed in a heater inert to lithium metal, and then were heated to a temperature at which lithium metal was melted, and vigorously stirred for 6 to 8 minutes. After the mixing is finished, the temperature was lowered to room temperature. The whole process was performed in an argon gas atmosphere.

Lithium metal-XE-2 microspheres obtained had a lithium metal loaded amount of 5.0%, which was measured by weighing and comparing with the weight of XE-2 which did not absorb lithium metal.

Example 12

200 mg of sodium metal (Sinopharm Chemical Reagent Co., Ltd.) and 200 mg of carbon nanotube microspheres, which were obtained by spray drying of carbon nanotubes and had an average pore size of 31.4 nm, were weighed and placed in a heater inert to lithium metal, and then were heated to 110° C., a temperature higher than the melting point of the metal sodium, and stirred for 10 minutes. After the mixing is finished, the temperature was lowered to room temperature. The whole process was performed in an argon gas atmosphere.

The sodium metal-carbon nanotube microspheres obtained had a sodium metal loaded amount of 50.0%, which was measured by weighing and comparing with the weight of carbon nanotube microspheres which did not absorb sodium metal.

It is to be understood that the Examples illustrated above and shown in the accompanying drawings should not be construed to limit the design idea of the present disclosure. Improvements and modifications in various forms may be made to the technical idea of the present disclosure by those skilled in the technical field to which the present disclosure pertains, and these improvements and modifications should be understood to be within the protection scope of the present disclosure.

It is also to be indicated that a term "include", "comprise", or any other variant, intends to indicate a nonexclusive inclusion, such that a process, method, article, or apparatus comprising a range of elements comprises not only those elements, but also other elements which are not specifically listed or the elements intrinsically possessed by this process, method, article, or apparatus.

The present application claims the priorities of Chinese Patent Application No. 201410106376.0, filed on Mar. 21, 2014, and Chinese Patent Application No. 201410395114.0, filed on Aug. 13, 2014, both of which are incorporated herein by reference in their entireties.

What is claimed is:

1. A lithium metal-porous carbon nanotube microsphere material composite, wherein the composite has a microscale spherical structure, and comprises a porous carbon nanotube microsphere material as a carrier to support a lithium metal, wherein the porous carbon nanotube microsphere material is in a form of spherical or spheroidal particles having an average diameter of 1 μm to 100 μm and an average pore size between 10 nm and 50 nm, each of the spherical or spheroidal particles consisting of carbon nanotubes and having nanoscale pores formed by interlaced carbon nanotubes inside the particle, and wherein the lithium metal is present in the pores of the porous carbon nanotube microsphere material and has a shape complementary to the pore,
wherein the carbon nanotube microsphere material has a maximum tolerable pressure of 20 MPa, and has a specific surface area of 197 to 1500 m²/g, and wherein the proportion of the lithium metal in the lithium metal-porous carbon nanotube microsphere material is 30 to 50% by mass.

2. The porous carbon nanotube microsphere material according to claim 1, which at least has any one of a spherical aggregated structure, a spheroidal aggregated structure, a porous spherical aggregated structure, and a donut-shaped aggregated structure.

3. The porous carbon nanotube microsphere material according to claim 1, wherein the carbon nanotubes include any one of multi-walled carbon nanotubes, double-walled carbon nanotubes, and single-walled carbon nanotubes, or a combination of two or more thereof.

4. The porous carbon nanotube microsphere material according to claim 1, wherein the carbon nanotubes include any one of commercial carbon nanotubes, purified carbon nanotubes, and surface-functionalized carbon nanotubes, or a combination of two or more thereof.

5. A negative electrode of a battery, wherein the material of the negative electrode is the lithium metal-porous carbon nanotube microsphere material composite according to claim 1.

6. A battery, comprising the negative electrode according to claim 5.

7. The battery according to claim 6, wherein the battery is a secondary battery, and the secondary battery is a lithium-sulfur battery, a lithium-oxygen battery, a lithium-polymer battery, or a rechargeable lithium ion battery.

8. A preparation method for a lithium metal-porous carbon nanotube microsphere material composite having a microscale spherical structure, comprising: uniformly mixing lithium in a melted state with a porous carbon nanotube microsphere material carrier to allow the metal lithium enter into the pores of the carbon nanotube microspheres by means of the wetting effect of molten metal lithium, followed by cooling, to obtain the lithium metal-porous carbon nanotube microsphere material composite, wherein the porous carbon nanotube microsphere material is in a form of spherical or spheroidal particles having an average diameter of 1 μm to 100 μm and an average pore size between 10 nm and 50 nm, each of the spherical or spheroidal particles consisting of carbon nanotubes and having nanoscale pores formed by interlaced carbon nanotubes inside the particle, wherein the carbon nanotube microsphere material has a maximum tolerable pressure of 20 MPa, and has a specific surface area of 197 to 1500 $m^2/g$, and wherein the proportion of the lithium metal in the lithium metal-porous carbon nanotube microsphere material is 30 to 50% by mass.

\* \* \* \* \*